(12) United States Patent
Cardi et al.

(10) Patent No.: US 8,682,363 B1
(45) Date of Patent: Mar. 25, 2014

(54) SYSTEM AND METHOD OF SENDING NOTIFICATIONS PRIOR TO SERVICE ARRIVAL

(75) Inventors: Roland P. Cardi, North Kingstown, RI (US); Walter Minasian, Pawtucket, RI (US)

(73) Assignee: Eporin, LLC, West Warwick, RI (US)

( * ) Notice: Subject to any disclaimer, the term of this patent is extended or adjusted under 35 U.S.C. 154(b) by 121 days.

(21) Appl. No.: 13/206,562

(22) Filed: Aug. 10, 2011

(51) Int. Cl.
*H04W 4/00* (2009.01)
*H04W 24/00* (2009.01)

(52) U.S. Cl.
USPC ............... 455/466; 455/456.1; 455/456.3

(58) Field of Classification Search
USPC ................................................ 455/466
See application file for complete search history.

(56) References Cited

U.S. PATENT DOCUMENTS

| | | | |
|---|---|---|---|
| 5,400,020 A | 3/1995 | Jones et al. | |
| 5,623,260 A | 4/1997 | Jones | |
| 5,648,770 A | 7/1997 | Ross | |
| 6,236,357 B1 * | 5/2001 | Corwith | 342/357.31 |
| 6,975,998 B1 | 12/2005 | Jones | |
| 7,809,377 B1 | 10/2010 | Lau et al. | |
| 2004/0243664 A1 * | 12/2004 | Horstemeyer | 709/200 |
| 2004/0249937 A1 * | 12/2004 | Tachihara et al. | 709/224 |
| 2005/0143097 A1 * | 6/2005 | Wilson et al. | 455/456.3 |
| 2008/0169937 A1 * | 7/2008 | Lowry | 340/686.6 |
| 2009/0075673 A1 * | 3/2009 | Kim et al. | 455/456.1 |
| 2009/0192702 A1 * | 7/2009 | Bourne | 701/200 |
| 2010/0105412 A1 * | 4/2010 | Won et al. | 455/456.1 |
| 2011/0210835 A1 * | 9/2011 | Kondo | 340/425.5 |

* cited by examiner

*Primary Examiner* — Lester Kincaid
*Assistant Examiner* — Andy Gu
(74) *Attorney, Agent, or Firm* — Burns & Levinson LLP; Bruce D. Jobse, Esq.

(57) ABSTRACT

A system and method for providing notification to a recipient of an arrival of a vehicle at an instant when the vehicle's estimated time to a destination corresponds to a recipient-defined pre-arrival notification interval is disclosed. In one embodiment, a system includes a location status module that determines the location of the vehicle. An appointment module determines the vehicle's estimated time to a destination and then determines if the estimated time to destination corresponds to a recipient-defined pre-arrival notification interval. If the vehicle's estimated time to destination corresponds to the recipient-defined pre-arrival notification interval, the appointment module sends a notification to the recipient. According to embodiments, the appointment module determines if the vehicle's estimated time to destination equals a pre-arrival notification interval. If the estimated time to destination equals the pre-arrival notification interval, a notification is sent to the recipient.

18 Claims, 6 Drawing Sheets

APPOINTMENT FORM — 200

CUSTOMER NAME: JOHN DOE — 202

CUSTOMER ADDRESS: 122 MAIN ST, BOSTON, MA 02118 — 204

CUSTOMER PHONE NUMBER: (617) 222-1224 — 206

CUSTOMER EMAIL ADDRESS: JOHNDOE@USA.COM — 208

RECIPIENT NAME: JANE DOE — 210

RECIPIENT PREFERRED NOTIFICATION METHOD: TEXT — 212

RECIPIENT NOTIFICATION CONTACT INFORMATION: (617) 333-1224 — 214

PRE-ARRIVAL NOTIFICATION INTERVAL: 25 MINUTES — 216

APPOINTMENT TYPE: DELIVERY — 218

APPOINTMENT ADDRESS: 122 MAIN ST, BOSTON, MA 02118 — 220

. . .

ORDER INVENTORY: 1 TABLE
4 CHAIRS — 222

FIGURE 2

SYSTEM AND METHOD OF SENDING NOTIFICATIONS PRIOR TO SERVICE ARRIVAL

FIELD OF THE INVENTION

The disclosure relates to techniques for sending notification of an arrival of a service, and, more particularly, to a system and method of sending notification of an arrival of a vehicle to a recipient at a recipient-defined, pre-determined interval prior to actual arrival.

BACKGROUND OF THE INVENTION

In existing delivery services, a recipient of a shipment is not always aware when a shipment is being sent to the recipient. In this regard, a sender does not always inform the recipient when sending a shipment to the recipient via a delivery service. Furthermore, the operator of the delivery service usually does not provide the recipient with advanced notice of the package. Therefore, the recipient is often not aware that a shipment has been sent to the recipient until the package is actually delivered to the recipient.

In some situations, the sender may notify the recipient that the sender is sending a shipment to the recipient. However, the sender may not know or may not provide to the recipient an approximate date or time on which the shipment should arrive. Therefore, the recipient is aware that a shipment has been sent but is not aware of when the shipment should arrive.

Furthermore, even with existing shipment tracking systems, the recipient is not usually aware of the precise time that the shipment will be delivered. For example, when a shipment is scheduled to be delivered on a particular day, the shipment may arrive at any time on that date, the actual time of delivery being dependant on the route and the number and length of stops made by the delivery vehicle on the way to the recipient.

In various industries, such as the furniture industry, deliveries may not be made if the delivery service is unable to enter the premises at which the furniture is to be delivered. As a result, the delivery service either has to reschedule the delivery for another time, which is cost prohibitive and cumbersome, or wait until the recipient provides access to the premises. The additional wait delays the delivery of subsequent shipments and the delay is compounded if the delivery vehicle has to wait at multiple destinations to deliver the furniture.

Similar problems arise in other situations that require a recipient to be present at the place of service at the time of service. In particular, a service technician who services a customer's equipment at a customer's place of business or residence can experience similar delays if the customer is not present at the time the service technician arrives at the destination.

Accordingly, there is a need for a notification system and method that can notify a recipient ahead of time of the arrival of a vehicle.

SUMMARY OF THE INVENTION

Disclosed herein are technologies for providing notification to a recipient of an arrival of a vehicle or service personnel at an instant when the vehicle's estimated time to a destination corresponds to a recipient-defined pre-arrival notification interval. In particular, a recipient is notified of an impending arrival of a vehicle at an instant when the vehicle's estimated time to a destination equals a pre-arrival notification interval defined by the recipient.

In one embodiment, a system for providing a notification to a recipient associated with an impending arrival of a vehicle includes a location status module that determines the location of the vehicle. An appointment module determines the vehicle's estimated time to a destination and then determines if the estimated time to destination corresponds to, or in some embodiments, equals a recipient-defined pre-arrival notification interval. If the vehicle's estimated time to destination corresponds to the recipient-defined pre-arrival notification interval, the appointment module sends a notification to the recipient.

In another embodiment, a method for providing a notification to a recipient associated with an impending arrival of a vehicle includes determining the location of the vehicle. The vehicle's estimated time to a destination is then determined and compared with a recipient-defined pre-arrival notification interval. If the vehicle's estimated time to destination corresponds to the recipient-defined pre-arrival notification interval, a notification is sent to the recipient.

In yet another embodiment, a data structure residing in memory for providing a notification to a recipient associated with an impending arrival of a movable entity includes a recipient notification ID field storing notification address information associated with a recipient and a recipient defined pre-arrival notification interval field for storing a pre-arrival notification interval defined by the recipient.

BRIEF DESCRIPTION OF THE DRAWINGS

FIG. 2 illustrates a conceptual data structure representing an exemplary appointment form including various fields in accordance with some embodiments of the present invention;

DETAILED DESCRIPTION

Disclosed herein are technologies for providing notification to a recipient of an arrival of a vehicle when the vehicle's estimated time to a destination corresponds to a recipient-defined pre-arrival notification interval. The present disclosure will be more completely understood through the following description, which should be read in conjunction with the attached drawings. In this description, like numbers refer to similar elements within various embodiments of the present disclosure. Within this description, the claimed invention will be explained with respect to embodiments. The skilled artisan will readily appreciate that the methods and systems described herein are merely exemplary and that variations can be made without departing from the spirit and scope of the invention.

Figure 1:
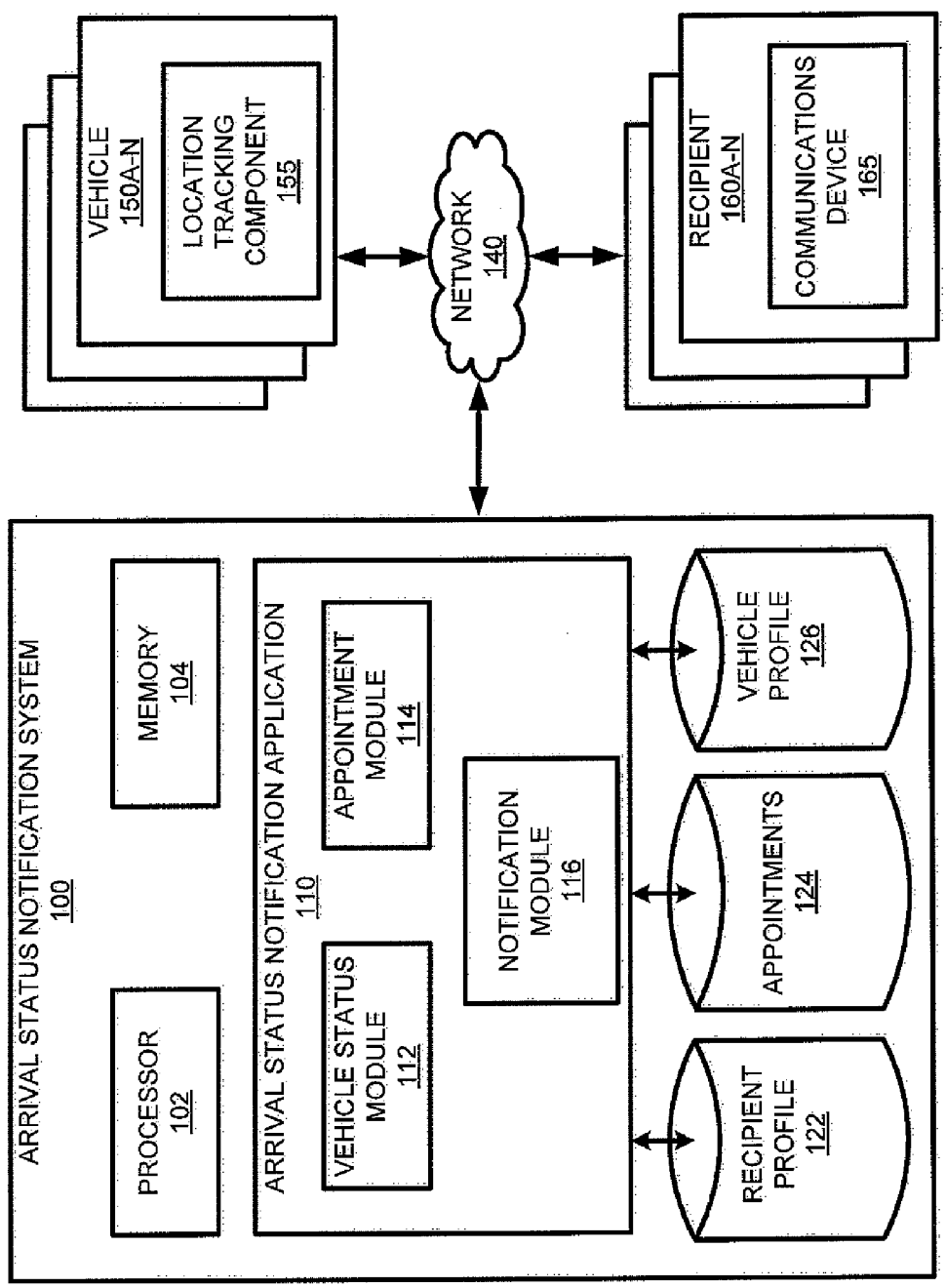
FIG. 1 illustrates a block diagram of an arrival status notification system, in accordance with some embodiments of the present invention.

Referring now to the figures, FIG. 1 illustrates a block diagram of an arrival status notification system 100 for notifying a recipient 160 of an arrival of a movable entity or vehicle 150 when the vehicle's estimated time to a destination corresponds to a recipient-defined pre-arrival notification interval. The recipient-defined pre-arrival notification interval may be a length of time prior to a vehicle's arrival at a destination at which the recipient 160 desires to be notified. The recipient-defined pre-arrival notification interval may be based on the vehicle's estimated time to destination, which is an estimate of the length of time the vehicle 150 will take to arrive at a particular destination. As such, although the recipient 160 may be notified when the vehicle's estimated time to destination corresponds to the recipient-defined pre-arrival notification interval, the vehicle's actual time to destination may vary from the estimated time to destination, due to various factors, including but not limited to, the speed of the vehicle 150, and the traffic conditions around the vehicle 150, including any of traffic volume, winter, road construction, etc. As will be described in further detail below, the vehicle 150 may be a vehicle, a person, or any other object or entity that is capable of moving and whose location may be tracked.

The arrival status notification system 100 may communicate with one or more vehicles 150A-N, one or more recipients 160A-N, and a notification system 160, via a network 140. The network 140 may include, but is not limited to, the Internet, a LAN, a WAN, a WLAN, a VPN, a cellular network, a WI-FI network, a secure or unsecured network, a public or private network, or any other type of network.

The vehicles 150A-N, generally referred to hereinafter as vehicle 150, may be any type of vehicle, including, but not limited to, a ground vehicle, such as a car, a truck, a van, a train or other vehicle including motorcycles, scooters, etc., an air vehicle, such as an aircraft or a helicopter, and a water-based vehicle, such as a ship a boat. The vehicle 150 may include a vehicle location tracking component 155, including but not limited to, a Global Positioning System (GPS) transmitter or receiver. The vehicle location tracking component 155 may be a component attached to the vehicle, a key or other component that is physically associated with the vehicle 150. In various embodiments, the vehicle location tracking component 155 may be associated with an operator of the vehicle 150, such as with a mobile device assigned to an operator of the vehicle 150. In addition, the vehicle location tracking component 155 may be configured to provide location information based on cellular tower locations, wireless signal locations, or any other existing location tracking technologies.

It should be appreciated that although the present disclosure discloses vehicles 150, and associated vehicle location tracking components 155, the present disclosure is not limited to vehicles being tracked. In some embodiments, an object or a person may be tracked. For instance, a service technician for providing a service at a home may be tracked using a location tracking component associated with the service technician's mobile device or equipment. This may be beneficial as the service technician may be travelling to a location using multiple forms of transportation, both public and private. In other embodiments, an object may be tracked. For instance, the object may be a package being delivered. By attaching a location tracking component to the package, the package may be tracked. Accordingly, it is within the scope of the present disclosure to provide a first party, advance notification of an impending arrival of a second party or vehicle 150, which may be a vehicle, person, or object.

The recipients 160A-N, generally referred to hereinafter as recipient 160 is the party that receives the notification of the impending arrival of the service personnel or vehicle 150. The recipient 160 may be any person or entity that receives the notification and may have no connection to the arrival location. The recipient 160 may have an associated communication device 165 that is configured to receive the notification of the impending arrival of the vehicle 150. The communication device 165 may be a mobile device, including but not limited to, a cellular phone, a laptop, a tablet computer, a personal digital assistant, or any other communications device, including but not limited to, a desktop computer, a phone, a radio, and the like. In embodiments, the communication device 165 may be configured to receive text messages, including but not limited to, Short Message Service (SMS) messages, Blackberry® instant messages, AOL instant messages, or messages from any other instant messaging service. In embodiments, the communication device 165 may be configured to receive notifications in the form of, including but not limited to, emails, phone calls, and the like.

The arrival status notification system 100 comprises a processor 102 and memory 104 as well as an arrival status notification application 110 that includes an arrival status module 112, an appointment module 114, and a notification module 116. The arrival status notification application 110 may be configured to communicate with one or more databases, including but not limited to, a recipient profile database 122, an appointments database 124, and a vehicle profile database 126.

The recipient profile database 122 may include entries associated with each of the recipients 160. The entries may include information about the recipient, including but not limited to, the recipient's name, contact information, address, appointment history, notification communication preferences, and pre-arrival notification interval preferences, amongst others.

The appointments database 124 may include entries associated with each appointment, including but not limited to, the type of appointment, the recipient associated with the appointment, the vehicle associated with the appointment, prior appointment history, pre-arrival notification interval preferences, and notification communication preferences, including but not limited to, an SMS message, text message, instant message, email, phone call, page, or any other type of notification, amongst others.

The vehicle profile database 126 may include entries associated with each of the vehicles 150. Each vehicle entry may include information about the vehicle, including but not limited to, the type of vehicle, a location tracking component identification, schedules of vehicle routes, vehicle availability schedules, vehicle service history, and other vehicle related information.

The arrival status notification application 110 may include one or more software modules, including but not limited to, the vehicle status module 112, the appointment module 114, and the notification module 116. It should be appreciated that the arrival status notification application 110 may include one or more modules that perform some or all of the functionality performed by the modules 112, 114, 116. Each of the modules 112, 114, 116 may be configured to communicate with one or more databases, including the databases 122, 124, 126.

The vehicle status module 112 is configured to communicate with the vehicle 150, or more specifically, with the location tracking component 155 associated with the vehicle 150. The vehicle status module 112 can receive status information of the vehicle 150, including but not limited to, the vehicle's navigation status, such as the vehicle's current location, the vehicle's current direction, the vehicle's current speed, as well as other vehicle related information. In addition, the vehicle status module 112 may be configured to identify a destination of the vehicle 150 and calculate an estimated time to the destination for the vehicle 150. The vehicle status module 112 may continuously or periodically monitor the status information of the vehicle 150 and the vehicle's route and determine an updated estimated time to destination based on new information related to the vehicle 150 and/or their routes.

The vehicle status module 112 may be configured to provide status information of the vehicle received from the vehicle 150 to the appointment module 114 and/or the notification module 116. In one embodiment, the vehicle status module 112 may utilize third party vehicle route planning tools or applications to determine the estimated time to destination, such as Direct Route and DRTrack, commercially available from Appian Logistics Software, Inc. of Oklahoma City, Okla., U.S.A. It should be appreciated that vehicle route planning tools or applications may be able to determine the vehicle's estimated time to destination by monitoring traffic conditions, weather conditions, public transport schedules and delays, amongst other factors.

The appointment module 114 may receive vehicle status information of the vehicle 150 from the vehicle status module 112. In various embodiments, the appointment module 114 may perform one or more of the functions performed by the vehicle status module 112, including but not limited to, determining the vehicle's estimated time to destination. To do so, the appointment module 114 may retrieve or receive a destination address where the vehicle 150 is to arrive from any one of the databases 122, 124, 126.

The appointment module 114 may also generate vehicle routes for each of the vehicles 150 based on a list of appointments scheduled for a specific time range, including but not limited to, a particular week, a particular date, or a block of hours, such as between 8:00 am and 11:00 am. In various embodiments, the appointment module 114 may retrieve or receive a list of appointments from the appointments database 124. The appointment module 114 may then analyze the list of appointments and generate vehicle routes for each of the vehicles such that all the appointments scheduled within the specific time range are accommodated. In various embodiments, the appointment module 114 may utilize commercially available vehicle route generation tools or applications to generate the vehicle routes. Furthermore, the appointment module 114 may take into consideration, various factors when generating vehicle routes. For example, some factors the appointment module 114 may consider include distances and travel times between subsequent appointment destinations, the type of appointment, such as a delivery or a service call, notification preferences of the recipient, the length of time of each appointment, vehicle operator breaks, such as a lunch break, amongst others.

Upon generating the vehicle route for each of the vehicles 150, the appointment module 114 can also determine the estimated time of arrival of the vehicles 150 at each of the destinations corresponding to the vehicle's generated vehicle route. The appointment module 114 may then store the estimated time of arrival information, including but not limited to, the vehicle routes of each vehicle 150 and the estimated time of arrivals at each destination in one or more of the vehicle profile database 126, the recipient profile database 122, and the appointments database 124.

As the vehicle is en route to a destination, the appointment module 114 may constantly or periodically determine the estimated time to destination and/or the estimated time of arrival at the destination. Then, the appointment module 114 compares the estimated time to destination with a corresponding pre-arrival notification interval defined by the recipient. When the appointment module 114 determines that the estimated time to destination corresponds to, or in some embodiments, matches or equals the corresponding pre-arrival notification interval defined by the recipient, the appointment module 114 may determine if a notification has previously been sent to the recipient 160. In this way, the arrival status notification application may prevent multiple notifications from being sent even though updated estimated times to destination correspond to the pre-arrival notification interval.

If no prior notification has been sent to the recipient 160, the appointment module 114 sends instructions to the notification module 116 to send a pre-arrival notification to the recipient 160 indicating one or more of the vehicle's estimated time to destination or the vehicle's estimated time of arrival. If prior notification has been sent, the appointment module 114 may determine if the difference between the updated estimated time of arrival and the initial estimated time of arrival exceeds a threshold delay interval that may be defined by an entity servicing the appointment. If the difference exceeds the threshold delay interval, the appointment module 114 may send instructions to the notification module 116 to notify the appointment servicing entity. In some embodiments, the appointment module 114 may also send instructions to the notification module 116 to notify the recipient of the delay only if a pre-arrival notification has not previously been sent. In addition, the appointment module 114 may send additional instructions to the notification module 116 to notify the appointment servicing entity of delays to subsequent appointments.

In some embodiments, special procedures may need to be implemented for recipients 160 that define a pre-arrival notification interval that exceeds the estimated time to destination associated with the recipient 160 from the start of the vehicle route. For instance, the first destination of a vehicle route may be five minutes away from the starting location of the vehicle 150. If the pre-arrival notification interval is pre-defined to twenty five minutes, the arrival status notification application 110 can send a pre-arrival notification twenty minutes prior to the scheduled start time of the vehicle route. To do so, the appointment module 114 may be configured to determine a scheduled start time of the vehicle 150 and an originating location of the vehicle 150 at the corresponding start time. The appointment module 114 may then identify any appointment whose recipient 160 has a pre-defined arrival notification interval that exceeds the estimated time to destination from the scheduled start time. Upon identifying such appointments, the appointment module 114 sends preliminary notifications to the recipients indicating an estimated arrival time. Once the vehicle begins the vehicle route, the appointment module 114 may send a subsequent notification confirming the estimated time of arrival or providing a corrected estimated time of arrival that corresponds with an updated estimated time of arrival. In other embodiments, the appointment module 114 may determine if the estimated time of arrival falls outside a correction threshold of the preliminary notification arrival time, as indicated in the preliminary notifications sent to the recipients. The correction threshold may be predefined in the system as a unit of time, distance or as a parameter associated with time or distance. For instance, the correction threshold may be a percentage of the recipient-defined pre-arrival notification interval. If the estimated time of arrival falls outside a correction threshold of the preliminary notification arrival time, the appointment module 114 causes a corrected notification to be sent to a recipient indicating a corrected estimated time of arrival.

In various embodiments, the appointment module 114 may indicate a time at which the pre-arrival notification was sent to the recipient. If, from the time the pre-arrival notification was sent, the pre-arrival notification interval has lapsed and the vehicle 150 has still not arrived at the destination, the appointment module 114 may send instructions to the notification module 116 to send a second notification to the recipient 160 indicating the vehicle's updated estimated time of arrival and/or time to destination, based on the current location of the vehicle 150. In some embodiments, the appointment module 150 may cause the second pre-arrival notification to be sent to the recipient if the updated estimated time to destination exceeds a threshold second pre-arrival notification interval that may be predefined in the arrival status notification application 110. In addition, a late arrival message may also be sent to the appointment servicing entity indicating that the vehicle 150 is late.

The notification module 116, as described above, may be configured to receive instructions from the appointment module 114 to send notifications to one or more of the appointment servicing entity or recipients associated with appointments. The notification module 116 may communicate with one or more databases such as the recipient profile database 122, the appointments database 124 and the vehicle profile database 126. In various embodiments, upon receiving instructions to notify a recipient 160, the notification module 116 may determine a method of receiving notifications and address information associated with the method of notification, and generate a notification that includes a message and the address information of the recipient 160. According to embodiments, the notification module 116 may determine the method of notification and address information associated with the method of notification by performing a lookup operation in one or more of the databases 122, 124, 126.

For instance, the appointment module 114 may send instructions to the notification module 116 to send a notification to the recipient indicating that a vehicle 150 is arriving at a location in 25 minutes. The notification module 116 may obtain the recipient's desired method of receiving notification, such as an SMS message, e-mail, instant message, or a phone call, and retrieve address information associated with the desired mode of communication. In various embodiments, the address information may be a phone number, and instant message screen name, or an e-mail address. The notification module 116 may then generate a message indicating that the vehicle is arriving in 25 minutes and send it to the recipient's communication device 165 via the network 140. In various embodiments, the notification module 116 may be part of the appointment module 114, or alternatively, may be a separate entity, such as a third-party application or service with which the vehicle status notification system communicates via the network 140. In various embodiments, the notification module 116 may communicate with a third party messaging application, which may deliver messages to the recipients, as well as notify the notification module 116 if the notification was delivered successfully or if the notification was unable to be delivered. Examples of such third party messaging applications include ActiveXperts SMS Messaging Server, commercially available from ActiveXperts Software B.V. of Overijssel (OV), The Netherlands.

FIG. 2 illustrates a conceptual data structure including various fields in accordance with some embodiments of the present invention. As described above, the present disclosure may be applicable in a variety of applications and industries. For the sake of explanation, an exemplary data structure including various fields 202-222 are shown. In particular, a customer name field 202, a customer address field 204, a customer phone number field 206, customer e-mail address field 208, a recipient name 210, a recipient delivery notification method field 212, a recipient delivery notification contact information field 214, a pre-arrival notification interval field 216, an appointment type field 218, an appointment address field 220, and an inventory field 222 may all be part of a sample appointment form 200. The appointment form 200 may be stored as an entry in the appointments database 124, and one or more fields 202-222 may be stored in one or more of the databases 122, 124, 126. It should be appreciated that each of the fields 202-222 may have predefined field types and lengths. As shown in FIG. 2, the recipient of the notification may be different from the customer or the person receiving any goods or services associated with the appointment. This is illustrated in FIG. 2 with particular reference to fields 202 and 210, where the customer name is John Doe and the recipient name is Jane Doe. It should further be understood that the sample appointment form 200 shown in FIG. 2 is merely used for illustrative purposes, and is not intended to limit the scope of the application in any manner.

Figure 3:
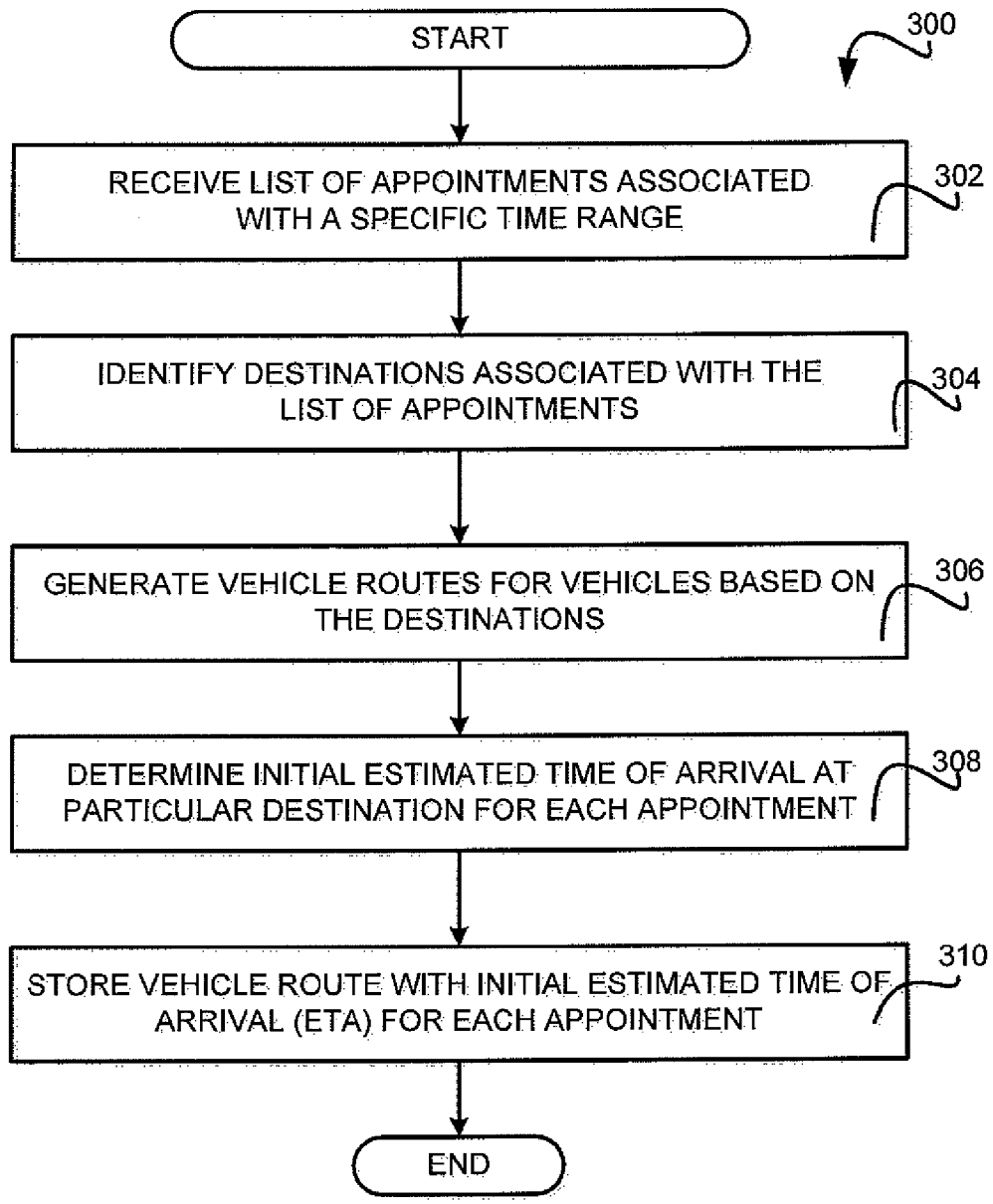
FIG. 3 illustrates an exemplary logical flow diagram for establishing a vehicle route in accordance with some embodiments of the present invention.

FIG. 3 illustrates an exemplary logical flow diagram for generating a vehicle route in accordance with some embodiments of the present invention. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 3, 4A and 4B making up the embodiments of the present invention described herein are referred to variously as operations, structural devices, acts or modules. It will be recognized by one skilled in the art that these operations, structural devices, acts and modules may be implemented in software, in special purpose digital logic, and any combination thereof without deviating from the spirit and scope of the present invention as recited within the claims attached hereto.

A routine 300 begins at operation 302, where the appointment module 114 receives a list of appointments associated with a specific time range, including but not limited to, a week, a day, or part of a day. The list of appointments may include one or more types of appointments, such as deliveries, service calls, pickups, and the like. In any event, each appointment includes a vehicle 150 traveling to a particular destination. As described above, the vehicle 150 may include a traditional vehicle, such as a car, truck, train, aircraft, or alternatively, one or more persons. The list of appointments may be obtained from a database such as the appointments database 124.

From operation 302, the routine 300 proceeds to operation 304, where the appointment module 114 identifies destinations associated with the list of appointments. It should be appreciated that these destinations refer to actual physical locations. From operation 304, the routine 300 proceeds to operation 306, where the appointment module 114 generates a vehicle route for one or more vehicles 150 based on the identified destinations of the appointments scheduled for the specific time range. In various embodiments, the appointment module 114 may take various factors into consideration when generating vehicle routes for the vehicles 150. Examples of such factors include but are not limited to, the type of appointment, the anticipated length of each appointment, the distances and/or travel times between some subsequent destinations, and preferences of the recipients of the appointment, and/or the recipients of the pre-arrival notification 160.

Once the appointment module 114 generates a vehicle route for a particular vehicle 150, the routine 300 proceeds from operation 306 to operation 308, where the appointment module 114 determines an initial estimated time of arrival at each destination associated with the generated vehicle route.

In various embodiments, the appointment module 114 may determine initial estimated times of arrival based on commercially available route planning tools. In order for the appointment module 114 to determine the initial estimated times of arrival, the appointment module 114 may need to determine a start location from where the vehicle 150 begins the vehicle route. In various embodiments, the vehicle status module 112 may determine a current location of the vehicle and provide the location to the appointment module 114. Furthermore, the appointment module 114 may assume a particular start time that corresponds to the specific time range associated with the list of appointments.

From operation 308, the routine 300 proceeds to operation 310, where the appointment module 114 stores the vehicle route with initial estimated times of arrival for the corresponding destinations in the appointments database 124 and/or the vehicle profile database 126. In addition, the appointment module 114 may also store the vehicle route associated with the vehicle 150 in the vehicle profile database 126. From operation 310, the routine 300 ends.

Figure 4A:
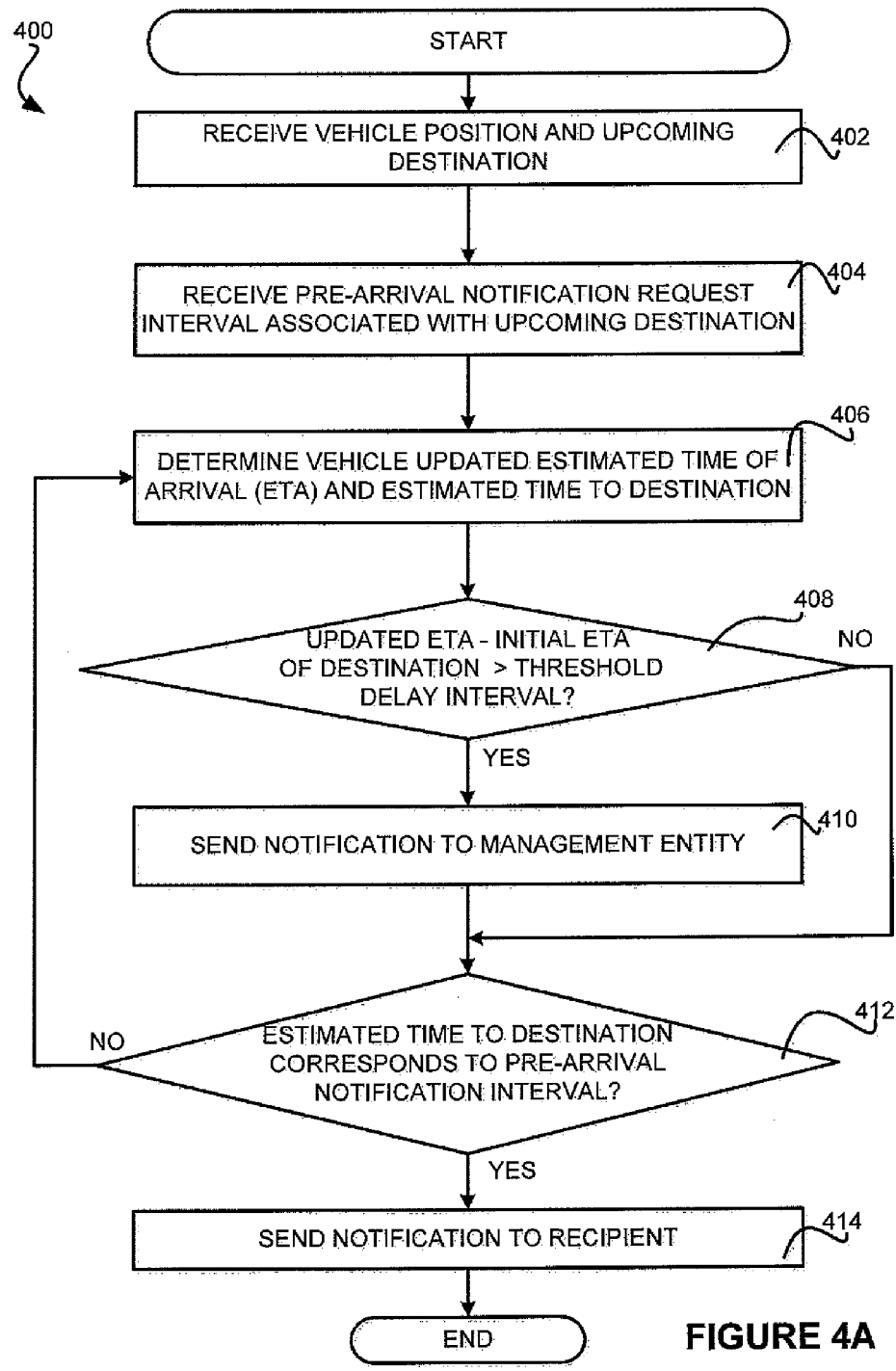
FIGS. 4A-B illustrate exemplary logical flow diagrams for notifying recipients of an impending vehicle arrival in accordance with some embodiments of the present invention.
Figure 4B:
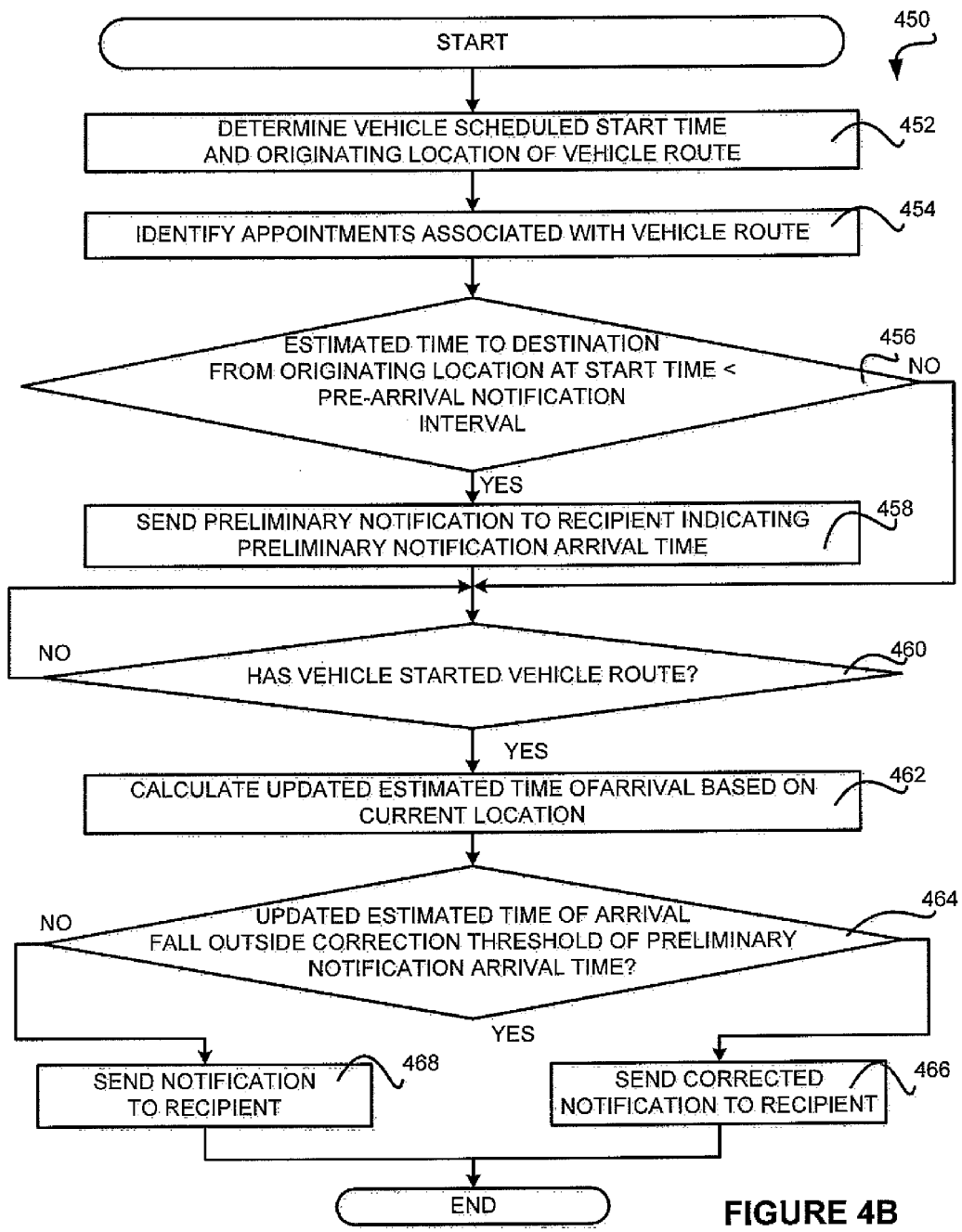

FIGS. 4A-B illustrate exemplary logical flow diagrams for notifying recipients of an arrival of a vehicle in accordance with some embodiments of the present invention. A routine 400 begins at operation 402, where the appointment module 114 receives a current location of a particular vehicle 150 and a destination towards which the vehicle 150 is headed. In various embodiments, the appointment module 114 may receive the current location of the vehicle 150 from the vehicle status module 112, which communicates with the location tracking component 155 of the vehicle 150 to determine a current location of the vehicle 150. The appointment module 114 may receive the destination of the vehicle 150 from the delivery address field 220 of the appointment form 200, which may be stored in the appointments database 124. From operation 402, the routine 400 proceeds to operation 404, where the appointment module 114 may receive the pre-arrival notification interval associated with the upcoming appointment. In various embodiments, the appointment module 114 may receive the pre-arrival notification interval 216 from the appointment form 200.

From operation 404, the routine 400 proceeds to operation 406, where the appointment module 114 determines an updated estimated time to destination and/or time of arrival to the destination associated with the upcoming appointment. In various embodiments, the vehicle status module 112 may continuously or periodically retrieve an updated vehicle location by communicating with the location tracking component 155 of the vehicle 150. The appointment module 114 may utilize the updated vehicle location to determine an updated estimated time of arrival to the destination. In various embodiments, the appointment module 114 may utilize commercially available route planning software applications that can determine an estimated time to destination and/or an estimated time of arrival based on current traffic flow conditions, public transportation delays, construction zones, reduced speed limits, amongst other factors that may influence the movement of the vehicle 150.

From operation 406, the routine 400 proceeds to operation 408, where the appointment module 114 determines whether the difference between the updated estimated time of arrival and the initial estimated time of arrival exceeds a threshold delay interval predefined by the arrival status notification system 100.

If, at operation 408, the appointment module 114 determines that the difference between the updated estimated time of arrival and the initial estimated time of arrival exceeds a threshold delay interval, the routine 400 proceeds to operation 410, where the notification module 116 sends a notification to the appointment servicing entity indicating that the vehicle 150 is delayed. In various embodiments, the arrival status notification system 100 may be configured to send the notification to any entity predefined in the system 100 to receive such notifications. From operation 410 the routine 400 proceeds to operation 412.

If, at operation 408, the appointment module 114 determines that the difference between the updated estimated time of arrival and the initial estimated time of arrival is not greater than the threshold delay interval, the routine 400 proceeds directly from operation 408 to operation 412, where the appointment module 114 determines whether the estimated time to destination corresponds to, or in some embodiments, matches or equals the pre-arrival notification interval. As described above, the vehicle status module 112 may, continuously or periodically, determine the current location the vehicle 150. As described above, the pre-arrival notification interval may be a length of time prior to a vehicle's arrival at a destination at which the recipient 160 desires to be notified.

If, at operation 412, the appointment module 114 determines that the updated estimated time to destination is not equal the pre-arrival notification interval, the routine 400 returns to operation 406, where the appointment module 114 determines an updated estimated time to destination based on the new current location of the vehicle 150. However, if, at operation 412, the appointment module 114 determines that the updated estimated time to destination corresponds to the pre-arrival notification interval, the routine 400 proceeds to operation 414, where the notification module 116 sends a notification to the recipient 160 notifying them of the vehicle's impending arrival. In various embodiments, the appointment module 114 may provide instructions to the notification module 116 to notify the recipient 160. Upon receiving instructions to notify the recipient 160, the notification module 116 may determine the recipient's preferred method of notification, which may be stored in the recipient preferred notification method field 212 of an appointment form, such as the appointment form 200 corresponding to the recipient. In addition, the notification module 116 may determine notification contact information, which may be stored in the notification contact information field 214 of the appointment form 200. The notification module 116 may then generate a notification that includes a message notifying the recipient of the estimated time of arrival of the vehicle 150, and send the generated message to the recipient 160 via the recipient's preferred notification method. It should be appreciated that additional details regarding the appointment and/or the vehicle may be provided along with the message.

It should be appreciated that the estimated time to destination and the estimated time of arrival correspond to one another. To be clear, the estimated time of arrival indicates a time at which the vehicle will arrive at a destination. The estimated time to destination indicates the amount of time from the current instant for the vehicle to arrive at the destination. Accordingly, the arrival status notification application 110 may be configured to determine either or both of the estimated time to destination and the estimated time of arrival. Furthermore, the recipient 160 refers to the recipient of the notification. The recipient 160 may also be the entity associated with the destination, such as the recipient of a delivery package.

Based on the description provided herein, those skilled in the art should appreciate that the scope of the application is not limited to delivering shipments or making service calls. Rather, the scope of the application extends to any situation where a recipient may be notified of an impending arrival of a vehicle at an instant when the vehicle's estimated time to a destination corresponds to a recipient-defined pre-arrival notification interval. The destination may or may not be the vehicle's final destination, but rather, any location through which the vehicle may pass through.

In other embodiments, rather than the notifying recipient 160 of the estimated time in which a vehicle or service personnel will arrive at a designated location, the recipient 160 may specify a predetermined distance parameter such as for illustrative purposes, 10 miles, 15 miles, 25 miles, etc. The system disclosed herein may utilize substantially similar infrastructure and logical algorithm to implement such a service with the instantaneous distance of the vehicle or service personnel from the arrival location being utilized as the threshold for comparison to the recipient defined distance-based notification associated with the arrival. Such systems may be useful in less densely populated areas where distances may be greater, and travel times may be more constant. In such embodiment, the data structure of FIG. 2 will further comprise a parameter in place of or in addition to the pre-arrival notification parameter 216. In other embodiments, the recipient 160 may be notified by upon the occurrence of one or both of the recipient defined, pre-arrival notification interval or the recipient defined pre-arrival distance interval becoming true conditions.

Referring now to FIG. 4B, a routine 450 begins at operation 452, where the appointment module 114 determines a vehicle scheduled start time when the vehicle will begin the generated vehicle route and an originating location from where the vehicle 150 will begin the vehicle route. The vehicle scheduled start time corresponds with a start time of the generated vehicle route. From operation 452, the routine 450 proceeds to operation 454, where the appointment module 114 identifies the appointments associated with the vehicle route. As described above with respect to FIG. 3, the vehicle route and associated appointments are stored in one or more of the databases 122, 124, 126.

From operation 454, the routine 450 proceeds to operation 456, where the appointment module 114 determines if an estimated time to destination from the originating location at the start time is less than the recipient-defined pre-arrival notification interval associated with the recipient. If the estimated time to destination from the originating location is less than the recipient defined pre-arrival notification interval, the routine 450 proceeds to operation 458, where the appointment module 114 causes a preliminary notification to be sent to the recipient 160. In various embodiments, the preliminary notification may include an in estimated arrival time at the destination. It should be appreciated that in various embodiments, the preliminary notification may indicate that the notification is preliminary. In such embodiments, an updated notification is sent to the recipient 160 once the vehicle 150 has begun the vehicle route.

If, however, at operation 456, the estimated time to destination from the originating location is not less than the recipient defined pre-arrival notification interval, the routine 450 proceeds from operation 456 to operation 460, where the appointment module 114 determines if the vehicle 150 has started the vehicle route. The appointment module 114 may determine if the vehicle 150 has started the vehicle route by monitoring the location of the vehicle 150 via the vehicle status module 112. In other embodiments, an operator of the vehicle or service personnel may perform an action indicating that the vehicle route has begun. If the vehicle has not started the vehicle route, the routine 450 repeatedly returns to operation 460, where the appointment module 114 determines if the vehicle 150 has started the vehicle route until the vehicle route has started. If the appointment module 114 determines that the vehicle 150 has started the vehicle route, the routine 450 proceeds to operation 462, where the appointment module 114 calculates the vehicle's estimated time of arrival to the destination.

From operation 462, the routine 450 proceeds to operation 464, where the appointment module 114 determines whether the estimated time of arrival falls outside a correction threshold of the preliminary notification arrival time sent to the recipient is a preliminary notification in operation 458. The correction threshold may be predefined in the system as a unit of time, distance or as a parameter associated with time or distance. For instance, the correction threshold may be a percentage of the recipient-defined pre-arrival notification interval.

If, at operation 464, the appointment module 114 determines that the calculated updated estimated time of arrival differs from the preliminary notification arrival time by more than the correction threshold, the routine 450 proceeds to operation 466, where the appointment module 114 causes a corrected notification to be sent to the recipient indicating the updated estimated time of arrival. If, however, at operation 464, the appointment module 114 determines that the updated estimated arrival time falls within the correction threshold, the routine 450 proceeds to operation 468, where the appointment module causes a notification to be sent to the recipient 160. It should be appreciated that the correction threshold may be an absolute value, such that if the estimated time of arrival is earlier than or later than the preliminary notification arrival time by more than the corrected threshold, the notification is sent to the recipient. From operation 466 and 468, the routine 450 ends.

Figure 5:
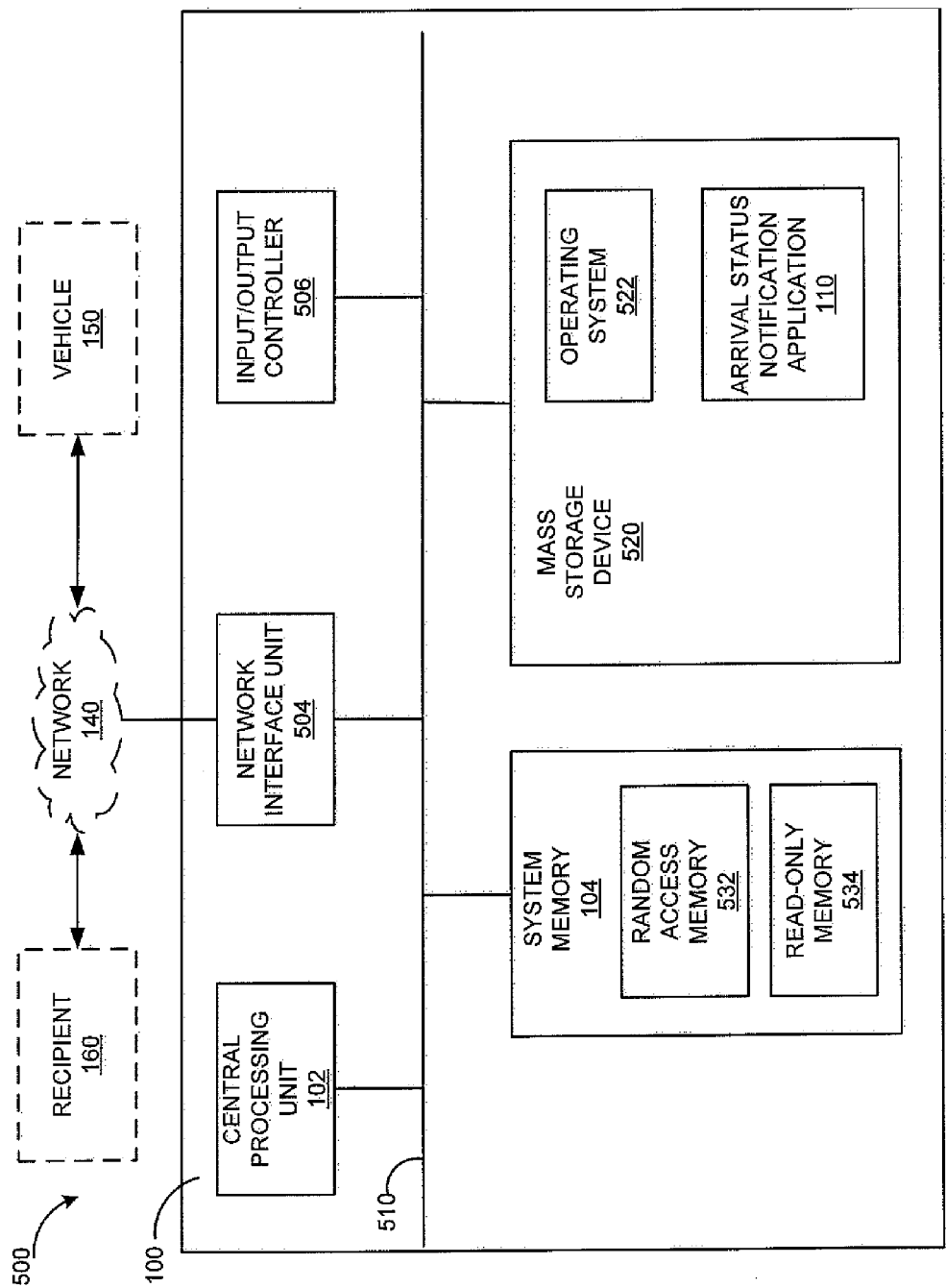
FIG. 5 illustrates a block diagram of a computer architecture for notifying recipients ahead of time of an arrival of a vehicle in accordance with some embodiments of the present invention.

FIG. 5 illustrates a block diagram of a computer architecture for notifying recipients of an impending vehicle arrival in accordance with some embodiments of the present invention. The computer architecture illustrated in FIG. 5 can include a central processing unit (CPU) or processor 102, a system memory 104, including a random access memory 532 (RAM) and a read-only memory 534 (ROM), and a system bus 140 that can couple the system memory 104 to the CPU 102. A basic input/output system containing the basic routines that help to transfer information between elements within the computer architecture 500, such as during startup, can be stored in the ROM 534. The computer architecture 500 may further include a mass storage device 520 for storing an operating system 522, software, data, and various program modules, such as the arrival status notification application 110.

The mass storage device 520 can be connected to the CPU 102 through a mass storage controller (not illustrated) connected to the bus 140. The mass storage device 520 and its associated computer-readable media can provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable media may include volatile and non-volatile, removable and non-removable media implemented in any method or technology for the non-transitory storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 500.

According to various embodiments, the computer architecture 500 may operate in a networked environment using logical connections to remote computers through a network such as the network 140. The computer architecture 500 may connect to the network 140 through a network interface unit 504 connected to the bus 140. It should be appreciated that the network interface unit 504 may also be utilized to connect to other types of networks and remote computer systems. The computer architecture 500 may also include an input/output controller 506 for receiving and processing input from a number of other devices, including a keyboard, mouse, or electronic stylus (not illustrated). Similarly, an input/output controller 506 may provide output to a video display, a printer, or other type of output device (also not illustrated).

As mentioned briefly above, a number of program modules and data files may be stored in the mass storage device 520 and RAM 532 of the computer architecture 500, including an operating system 522 suitable for controlling the operation of a networked desktop, laptop, server computer, or other computing environment. The mass storage device 520, ROM 534, and RAM 532 may also store one or more program modules. In particular, the mass storage device 520, the ROM 534, and the RAM 532 may store the arrival status notification application 110 for execution by the CPU 102. The arrival status notification application 110 can include software components for implementing portions of the processes discussed in detail with respect to FIGS. 1-4. The mass storage device 520, the ROM 534, and the RAM 532 may also store other types of program modules.

Software modules, such as the various modules within the arrival status notification application 110 may be associated with the system memory 104, the mass storage device 520, or otherwise. The arrival status notification application 110 may be able to provide notification of an impending delivery to a customer at a predetermined time prior to actual delivery. According to embodiments, the arrival status notification application 110 may be stored on the wireless communications network 140 and executed by a central computing device. In other embodiments, the arrival status notification application 110 may be stored on the network 140 and executed by any computer within the network 140.

The software modules may include software instructions that, when loaded into the CPU 102 and executed, transform a general-purpose computing system into a special-purpose computing system customized to facilitate all, or part of, delivery notification techniques disclosed herein. As detailed throughout this description, the program modules may provide various tools or techniques by which the computer architecture 500 may participate within the overall systems or operating environments using the components, logic flows, and/or data structures discussed herein.

The CPU 102 may be constructed from any number of transistors or other circuit elements, which may individually or collectively assume any number of states. More specifically, the CPU 102 may operate as a state machine or finite-state machine. Such a machine may be transformed to a second machine, or specific machine by loading executable instructions contained within the program modules. These computer-executable instructions may transform the CPU 102 by specifying how the CPU 102 transitions between states, thereby transforming the transistors or other circuit elements constituting the CPU 102 from a first machine to a second machine, wherein the second machine may be specifically configured to notify a recipient a predetermined pre-arrival interval before the arrival of an impending vehicle. The states of either machine may also be transformed by receiving input from one or more user input devices associated with the input/output controller 506, the network interface unit 504, other peripherals, other interfaces, or one or more users or other actors. Either machine may also transform states, or various physical characteristics of various output devices such as printers, speakers, video displays, or otherwise.

Encoding of the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the system memory 104 when the software is encoded therein. For example, the software may transform the state of transistors, capacitors, or other discrete circuit elements constituting the system memory 104.

As another example, the storage media may be implemented using magnetic or optical technology. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Based on the foregoing, it should be appreciated that technologies for providing notification to a recipient of an arrival of a vehicle when the vehicle's estimated time to a destination corresponds to a recipient-defined pre-arrival notification interval are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementation.

The subject matter described above is provided by way of illustration only and should not be construed as limiting. Various modifications and changes may be made to the subject matter described herein without following the example embodiments and applications illustrated and described, and without departing from the true spirit and scope of the present invention.

In addition, the disclosed system and technique should not be restricted to any specific implementations here described, for which other beneficial or alternate implementations may be substituted, in order to satisfy the organizational, functional or technology requirements imposed upon this disclosed system by any implementer. It will be apparent to those skilled in the art that modifications to the specific embodiments described herein may be made while still being within the spirit and scope of the teachings disclosed herein.

What is claimed is:

1. A system for providing a notification to a recipient associated with an impending arrival of a movable entity comprising:
   a location status module that determines a movable entity's location;
   an appointment module that determines a movable entity's estimated time to a destination,
   determines if the movable entity's estimated time to destination corresponds to a recipient-defined pre-arrival notification interval,
   in response to determining that the movable entity's estimated time to destination corresponds to the recipient-defined pre-arrival notification interval, causes an estimated arrival notification to be sent to the recipient;
   wherein the appointment module is further configured to:
      determine if the movable entity has arrived at the destination at an instant when the pre-arrival notification interval has lapsed since the pre-arrival notification was sent to the recipient;
      in response to determining that the movable entity has not arrived at the destination, determine an updated estimated time to the destination based on a new current location of the movable entity; and
      cause a subsequent pre-arrival notification to be sent to the recipient indicating the updated estimated time to destination in response to determining that the updated estimated time to destination exceeds a second pre-arrival notification interval.

2. The system of claim 1 wherein the estimated arrival notification is a SMS message.

3. The system of claim 1 wherein the estimated arrival notification is an email.

4. The system of claim 1 wherein the estimated arrival notification is an instant message.

5. The system of claim 1 wherein the estimated arrival notification is a phone call.

6. The system of claim 1 wherein the notification indicates that the movable entity's estimated time to destination corresponds to the pre-arrival notification interval.

7. The system of claim 1 wherein the appointment module receives recipient profile information including the predetermined pre-arrival notification interval.

8. The system of claim 1 wherein the appointment module determines if the movable entity's estimated time to destination corresponds to a recipient-defined pre-arrival notification interval comprises determining if the movable entity's estimated time to destination is equal to a recipient-defined pre-arrival notification interval.

9. The system of claim 1 wherein the appointment module is further configured to:
   determine if a pre-arrival notification has previously been sent;
   in response to determining that a pre-arrival notification has previously been sent, prevent a subsequent pre-arrival notification from being sent until a pre-arrival notification interval has lapsed from an instant when the pre-arrival notification was sent.

10. The system of claim 1, wherein the movable entity is one of a vehicle or a person.

11. A system for providing a notification to a recipient associated with an impending arrival of a movable entity comprising:
   a location status module that determines a movable entity's location;
   and an appointment module that determines a movable entity's estimated time to a destination,
   determines if the movable entity's estimated time to destination corresponds to a recipient-defined pre-arrival notification interval, and
   in response to determining that the movable entity's estimated time to destination corresponds to the recipient-defined pre-arrival notification interval, causes an estimated arrival notification to be sent to the recipient;
   wherein the appointment module is configured to: receive a plurality of appointments;
      determine a vehicle route for the movable entity based on the appointments;
      determine a movable entity's initial estimated time of arrival at each of the destinations corresponding to the appointments;
      determine an updated estimated time of arrival for the appointments based on a current location of the movable entity,
      compare the initial estimated time of arrival at an upcoming destination with the updated estimated time of arrival at the upcoming destination;
      determine that the updated estimated time of arrival exceeds the initial estimated time of arrival by a predetermined late notification interval; and
      cause a late arrival notification to be sent in response to determining that the updated estimated time of arrival exceeds the initial estimated time of arrival by a predetermined late notification interval.

12. The system of claim 11, wherein the appointment module is configured to:
   compare the initial estimated time of arrival at an upcoming destination with the updated estimated time of arrival at the upcoming destination.

13. The system of claim 12, wherein the appointment module is configured to:
   if the updated estimated time of arrival exceeds the initial estimated time of arrival by a predetermined late notification interval, cause a late arrival notification to be sent.

14. A method for providing a notification to a recipient associated with an impending arrival of a movable entity, comprising:
   determining a location of the movable entity;
   determining estimated time to a destination of the movable entity;
   determining if the movable entity's estimated time to destination corresponds to a recipient-defined pre-arrival notification interval;
   in response to determining that the movable entity's estimated time to destination corresponds to the recipient-defined pre-arrival notification interval, sending an estimated arrival notification to the recipient;
   determining if the movable entity has arrived at the upcoming destination at an instant when a pre-arrival notification interval has lapsed since the pre-arrival notification was sent to the recipient;
   in response to determining that the movable entity has not arrived at the upcoming destination, determining an updated estimated time to destination based on a new current location of the movable entity; and
   sending a subsequent pre-arrival notification to the recipient indicating the updated estimated time to destination in response to determining that the updated estimated time to destination exceeds a second pre-arrival notification interval.

15. The method of claim 14 wherein determining if the movable entity's estimated time to destination corresponds to a recipient-defined pre-arrival notification interval comprises determining if the movable entity's estimated time to destination is equal to a recipient-defined pre-arrival notification interval.

16. A method for providing a notification to a recipient associated with an impending arrival of a movable entity, comprising:

determining a location of the movable entity;

determining estimated time to a destination of the movable entity;

determining if the movable entity's estimated time to destination corresponds to a recipient-defined pre-arrival notification interval;

in response to determining that the movable entity's estimated time to destination corresponds to the recipient-defined pre-arrival notification interval, sending an estimated arrival notification to the recipient;

receiving a plurality of appointments;

determining a vehicle route for the movable entity based on the appointments;

determining a movable entity's initial estimated time of arrival at each of the destinations corresponding to the appointments;

determining an updated estimated time of arrival for the appointments based on a current location of the movable entity;

comparing the initial estimated time of arrival at an upcoming destination with the updated estimated time of arrival at the upcoming destination;

determining that the updated estimated time of arrival exceeds the initial estimated time of arrival by a predetermined late notification interval; and sending a late arrival notification in response to determining that the updated estimated time of arrival exceeds the initial estimated time of arrival by a predetermined late notification interval.

17. The method of claim 16, further comprising:

comparing the initial estimated time of arrival at an upcoming destination with the updated estimated time of arrival at the upcoming destination.

18. The method of claim 17, further comprising:

if the updated estimated time of arrival exceeds the initial estimated time of arrival by a predetermined late notification interval, sending a late arrival notification.

\* \* \* \* \*